United States Patent
Colobert et al.

(10) Patent No.: US 11,468,652 B2
(45) Date of Patent: Oct. 11, 2022

(54) METHOD FOR PRODUCING A DIGITAL REPRESENTATION FOR PRODUCING AN APPLIANCE FOR A LIVING BODY AND CORRESPONDING DEVICE

(71) Applicant: PROTEOR, Saint-Apollinaire (FR)

(72) Inventors: Briac Colobert, Dijon (FR); Jean-Charles Gesbert, Saint Malo de Phily (FR); Vincent Carre, Brazey en Plaine (FR)

(73) Assignee: PROTEOR, Saint-Apollinaire (FR)

( * ) Notice: Subject to any disclaimer, the term of this patent is extended or adjusted under 35 U.S.C. 154(b) by 0 days.

(21) Appl. No.: 17/057,791

(22) PCT Filed: Jun. 3, 2019

(86) PCT No.: PCT/FR2019/051298
§ 371 (c)(1),
(2) Date: Nov. 23, 2020

(87) PCT Pub. No.: WO2019/234335
PCT Pub. Date: Dec. 12, 2019

(65) Prior Publication Data
US 2021/0201596 A1    Jul. 1, 2021

(30) Foreign Application Priority Data
Jun. 5, 2018  (FR) ...................................... 1854857

(51) Int. Cl.
*G06T 19/20* (2011.01)
*A61H 3/00* (2006.01)

(52) U.S. Cl.
CPC ................ *G06T 19/20* (2013.01); *A61H 3/00* (2013.01); *G06T 2210/41* (2013.01); *G06T 2219/2021* (2013.01)

(58) Field of Classification Search
None
See application file for complete search history.

(56) References Cited

U.S. PATENT DOCUMENTS 11,191,691 B2 * 12/2021 Lee ........................... A61F 2/70
2003/0160786 A1 * 8/2003 Johnson .................. G06T 17/20
345/419

(Continued)

OTHER PUBLICATIONS

Julien Clin, PhD, MScA, et al., "Correlation Between Immediate In-Brace Correction and Biomechanical Effectiveness of Brace Treatment in Adolescent Idiopathic Scoliosis", Spine: An International Journal for the Study of the Spine, 2010, pp. 1706-1713, vol. 35. No. 18.

(Continued)

*Primary Examiner* — Sarah Le
(74) *Attorney, Agent, or Firm* — Sughrue Mion, PLLC

(57) ABSTRACT

The invention relates to a method for producing a digital representation for producing an appliance for a living body, particularly to be applied against the external surface of the living body. The invention is particularly intended for the production of orthoses and prostheses. The method according to the invention allows the digital representation of an appliance using a modelling of the internal and external structures of the living body to be fitted with an appliance.

20 Claims, 5 Drawing Sheets

(56) References Cited

U.S. PATENT DOCUMENTS

Figure 1:
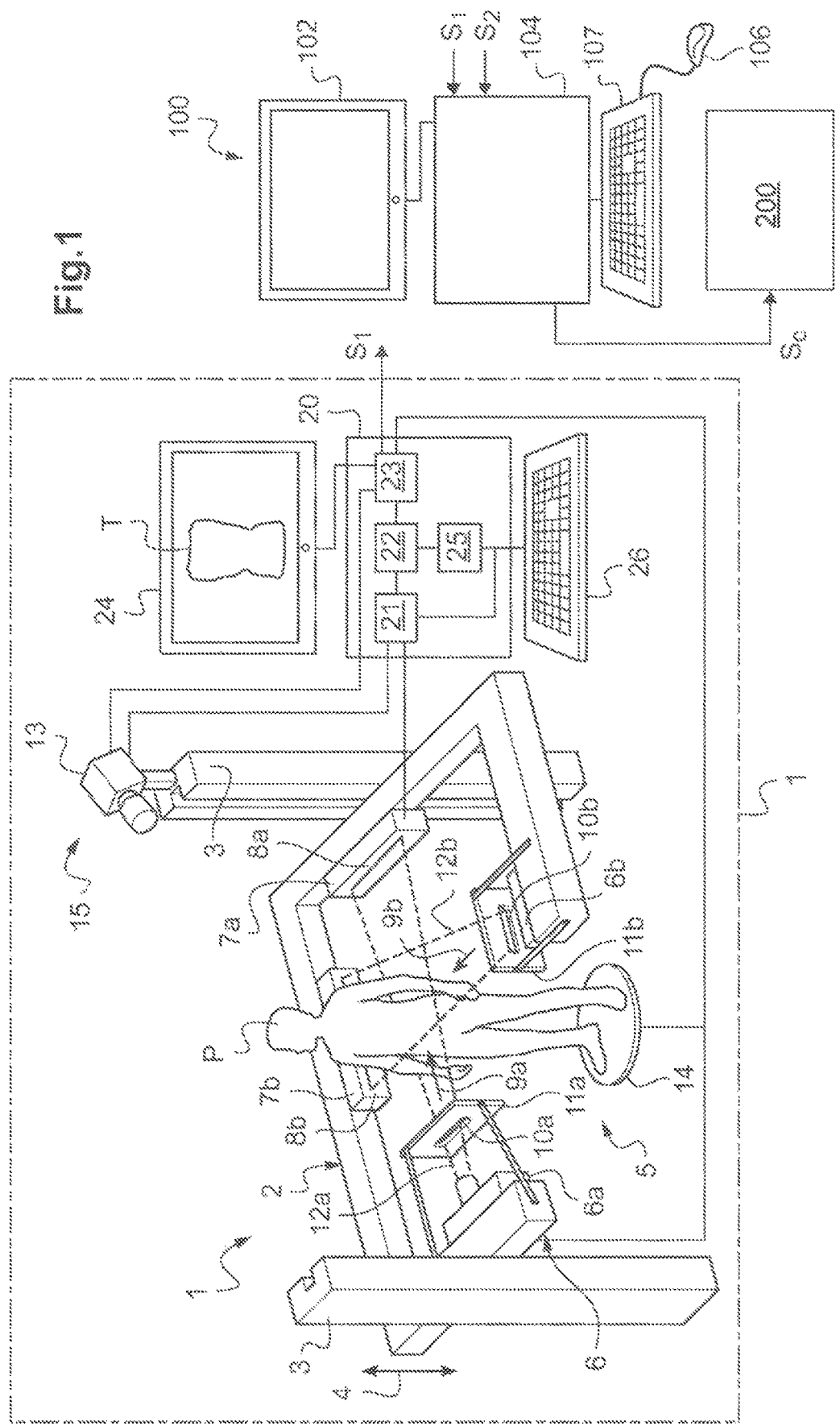

2016/0239631 A1\* 8/2016 Wu .................. G16H 50/50
2019/0035080 A1\* 1/2019 Bisker ................ G06T 7/74

OTHER PUBLICATIONS

M. Li et al., "Could clinical ultrasound improve the fitting of spinal orthosis for the patients with AIS?", European Spine Journal, 2012, pp. 1926-1935, vol. 21, No. 10.

International Search Report of PCT/FR2019/051298 dated Sep. 27, 2019 [PCT/ISA/210].

\* cited by examiner

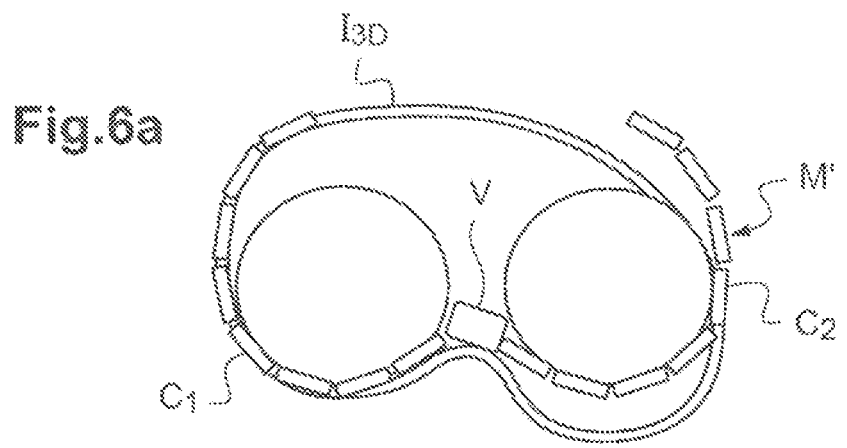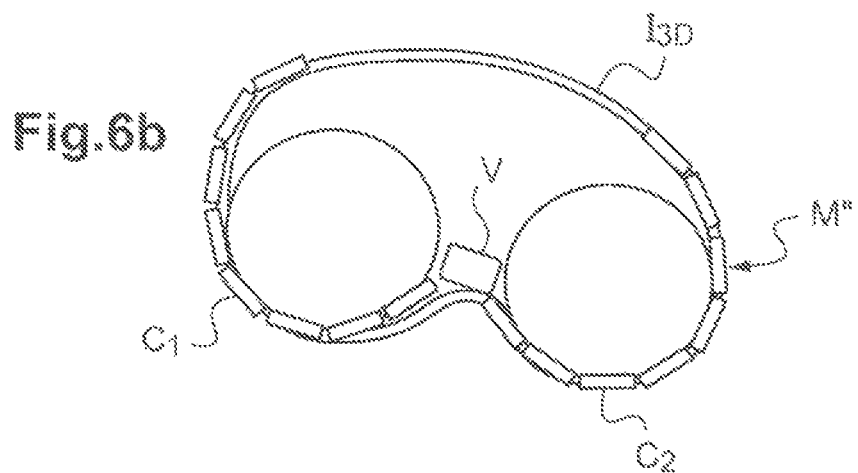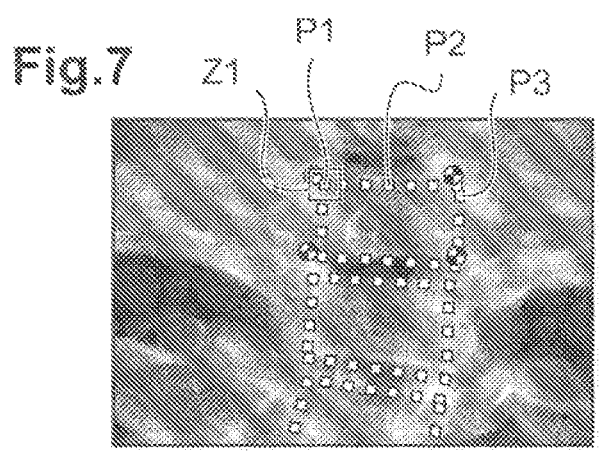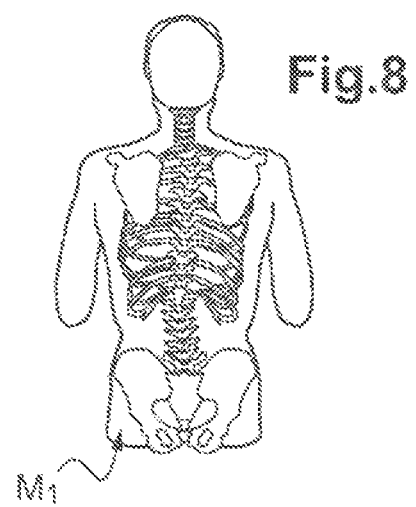

METHOD FOR PRODUCING A DIGITAL REPRESENTATION FOR PRODUCING AN APPLIANCE FOR A LIVING BODY AND CORRESPONDING DEVICE

CROSS REFERENCE TO RELATED APPLICATIONS

This application is a National Stage of International Application No. PCT/FR2019/051298 filed on Jun. 3, 2019, claiming priority based on French Patent Application No. 1854857 filed on Jun. 5, 2018.

The invention relates to a method for producing a digital representation for producing an appliance for a living body, particularly intended to be applied against the external surface of the living body.

The invention is more specifically intended for the production of orthoses and prostheses. An orthosis is an appliance which is applied externally to a part of the body to correct a deformation, enhance function or relieve the symptoms of a disease by supporting or assisting the neuro-musculo-skeletal system. A prosthesis is an appliance which replaces a missing body part.

Prostheses and orthoses are generally custom-made to optimize the efficacy and comfort thereof. These appliances are now routinely produced from three-dimensional representations of the external shape of a part of a human or animal body. This three-dimensional representation of the external shape is then used to form a three-dimensional model of a mold of the appliance or of the appliance.

In general, methods for producing these 3D (three-dimensional) models do not use a representation of the internal structure: the resulting model therefore does not take into account the internal structure of the patient, which can lead to the production of appliances in which the pressures are excessive on certain parts of the body, or, on the contrary, not strong enough.

There remain needs to enhance the adaptation of these appliances to the living body and thus reduce the risks of conflict between the appliances and the anatomical structures of the living body. There are also needs to enhance the precision of the supports and the efficacy of these appliances.

For this purpose, the invention proposes a method for producing a digital representation for producing an appliance for a part at least of a living body, comprising:

(1) receiving a first three-dimensional model of the internal and external structure of the object in a first three-dimensional frame of reference, (2) receiving a second three-dimensional model of the appliance to be produced defining at least one set of characteristic functional zones of the appliance, and, optionally a contour of the appliance, the second model comprising data:
  of coordinates in a second three-dimensional frame of reference of edge points belonging to the edge of a functional zone and of vertex points representing vertices of a functional zone.
  of a value of a deformation parameter, representative of the deformation of the functional zone, associated with each vertex point,
  optionally, of coordinates in the second frame of reference of contour points or lines of the appliance, (3) modifying the second model by applying to the points of the model a transformation matrix which expresses the coordinates of these points in the first frame of reference, (4) calculating for each functional zone of the second model:
  an edge curve, particularly continuous, passing through the edge points,
  a vertex curve, particularly continuous, passing through the vertex points, (5) transferring to the first model the edge curves, the vertex curves and the deformation parameter values associated with each vertex point of the second model, and optionally the contour points or lines of the appliance, (6) deforming the external surface of the first model according to the vertex curves to shape the external surface of the first model to the shape of the second model in each functional zone and obtain a corrected first model, (7) optionally, displaying a graphic representation of the corrected first model, (8) saving the corrected first model in a computer memory as the final model.

The method according to the invention thus makes it possible to obtain a three-dimensional model of the appliance integrated in the model of the living body or of a part of a living body. The use of a model of the living body including the internal structure to adapt an appliance model makes it possible to enhance the adaptation of the final model to the shape of the patient's body, and ultimately, the precision of the appliance. In particular, this precision can be enhanced further when the first model is itself obtained by means of a radiographic imaging method using image data of the object, particularly from two radiographic images of the internal structure and from one three-dimensional image of the external structure of the object.

The method according to the invention thus makes it possible to enhance the customization of the digital representation of the appliance and of the living body, this digital representation then being capable of being used directly to produce the appliance, or to produce a mold from which the appliance will be produced.

During step (3), the transformation matrix is thus applied to the points of the second model selected from the edge points, the vertex points and optionally the contour points. This matrix can optionally be applied to the contour lines of the second model. The transformation matrix can be calculated so as to match the characteristic references of the internal structure of the object to be fitted with an appliance defining the second frame of reference of the second model with the same characteristic references present in the first model.

The method can comprise, particularly after step (6) and preferably before step (8):
  receiving a correction coefficient input by a user to be applied to each value of the deformation parameter associated with a vertex point,
  correcting the values of the deformation parameter of the first model for each of the vertex points, and
  saving the corrected values in the computer memory.

This enables a user to control the rigidity of the appliance to be produced according to clinical considerations, thus ensuring better adaptation of the model and consequently of the appliance to be produced. Saving can be performed during step (8) or before.

The method can comprise, particularly after step (7) or (8), a step of transforming the final model into a set of instructions suitable for use for controlling a computer-assisted manufacturing machine, for producing the appliance or a mold of the appliance.

During step (1) of receiving a first model, a first model of the internal and external structure of an object forming a part at least of the living body is received, this part being intended to receive an appliance, for example an orthosis or prosthesis.

The object mentioned above can comprise particularly, a patient's spine, pelvis, or indeed knee, or more generally consist of all or part of the patient's body. In these different scenarios, the internal structures to be observed can consist particularly of the patient's bones.

Such a model comprises representative data of coordinates of points of the internal structure and of coordinates of points of the external structure (namely points of the surface of the object), these coordinates being expressed in a single three-dimensional frame of reference.

This first model can be generated by any known method of modelling the internal and external structure of an object. Suitable models can for example be generated using one or more techniques selected from magnetic resonance imaging (MRI), sonography, computed tomography (CT, see for example U.S. Pat. No. 8,634,626B2), conventional X-ray radiography techniques, fluoroscopy, ultrasound techniques.

In a preferred embodiment, the step (1) of receiving a first model of the internal and external structure of the object can comprise the generation of this first model by a radiographic imaging method based on image data of the object, particularly from two radiographic images of the internal structure and one three-dimensional image of the external structure of the object.

In an embodiment, this object being particularly located inside a field of view, the generation of the first model by the radiographic imaging method can comprise:

A. receiving first image data generated in a first three-dimensional reference frame of reference, representative of two two-dimensional radiographic images of the internal structure of the object captured along two non-parallel image capture directions, B. receiving second image data generated in a second reference frame of reference, representative of a three-dimensional image of an external envelope of the object, C. when the first and second reference frames of reference are different, transforming the image data received into a single frame of reference, D. estimating based on the second image data the coordinates in the reference frame of reference of first characteristic references of the internal structure, and, optionally, the value of at least one characteristic parameter of the internal structure, E. calculating, in the reference frame of reference, the three-dimensional shape of a model representing said internal structure from a previously known generic model of said internal structure, this generic model including points corresponding to the first references, the calculated model being obtained by deformation of the generic model such that said calculated model follows the closest possible shape to an isometry of the generic model while keeping the points of the deformed generic model coinciding with the first references, and optionally by applying to the calculated model the characteristic parameter(s) of the internal structure, F. choosing at least one second characteristic reference of the internal structure to be located on each of the two radiographic images, and optionally, at least a second reference to be located on a single radiographic image, and for each second reference:

(i) identifying a point belonging to the model calculated in step E) corresponding to the second reference,
(ii) calculating the coordinates of a projection of this point onto the radiographic image(s),
iii) determining based on the first image data the coordinates of the second reference on the radiographic image by searching in a search zone located around the projection coordinates, G. calculating the coordinates of the second references in the reference frame of reference based on the coordinates thereof on at least one of the radiographic images determined in step F), H. correcting the model calculated in step E) by matching the points of the calculated model corresponding to the second references with the coordinates thereof calculated in step G), I. reconstructing a model of the internal and external structure of the object with the data of the model corrected in step H) and the data of the three-dimensional image of the external envelope of the object expressed in the reference frame of reference.

The reference(s) mentioned above are anatomical references which can be points, segments, lines, arcs, contours, edges or others, or more generally consist of any characteristic anatomical point or elements of the patient's skeleton. Optionally, the first and second references can be the same references.

The characteristic parameter(s) of the internal structure can be anatomical parameters of the internal structure, such as for example dimensions of anatomical references. By way of example, the waist circumference or the height separating the waist circumference at the subaxillary level are morphological dimensions (measurable on the external envelope) making it possible to estimate an anatomical dimension of the internal structure (iliac bone width, height of vertebrae).

The radiographic imaging method enables reduced, or even zero, operator intervention to locate the anatomical points (second references) on a two-dimensional radiograph, thus facilitating this location and rendering same more reliable. Indeed, the location of the second references on the radiographic images uses a digitized 3D image of the object, processed to correct an existing generic model. The projection of this corrected model makes it possible to determine a probable position of the second references on a two-dimensional radiograph. The processing of each radiographic image about each probable position then helps locate the second references reliably. Thus, this image processing requires fewer resources as it is performed in a restricted zone of the radiographic image.

It will be noted that step D is carried out before step E, step B is carried out before step D and step A can be carried out at any time before step E. Step C, if it proves to be necessary, is implemented prior to use of the data from steps A or B in other steps.

The first and second image data are for example representative data of the coordinates of the points of a 2D or 3D image. It can consist of an electrical signal (image signal).

The second image data received in step B can be generated by an imaging system comprising at least one optical sensor. These second image data can advantageously be generated by means of one or more optical sensors, particularly non-irradiating or ionizing, for example one or more optical image sensors, converting a light signal into an electrical signal. The light signal used can be visible or not. By way of example, the imaging system capable of measuring an optical depth is usable, for example of the type described in the document WO 2007/043036.

In an embodiment, during step D, the estimated geometric position of the plurality of first references can be determined by first of all determining D(i) the coordinates of external references positioned on the external envelope in a three-dimensional frame of reference, then estimating D(ii) the coordinates of the first references in the same frame of reference from the external references.

Step D(i) can be obtained by calculating by means of a mathematical model, or indeed by processing the second image data, these external references being marked on the external envelope. It will be understood that this marking is carried out before the generation of the second image data received in step B.

The manual marking used in the case of image data processing can be passive marking. It can consist of positioning external references drawn on or attached to the patient's skin, having for example a specific shape and/or color or having a reflective surface capable of reflecting a light flash.

The drawn or attached external references can be referenced manually, for example designated on the digitized 3D image by an operator, or automatically for example by image processing software suitable for differentiating colors, light intensities, etc. Human intervention is required in this case, but remains limited.

The marking can also be active marking, such as the positioning of transmitters on the patient's skin, such transmitters optionally being able to transmit a characteristic signal of the position thereof capable of being detected by the imaging system suitable for digitizing the external envelope. This signal, for example a light signal, in the visible range or not, can be specific to each marker and/or transmitted locally at known time intervals or for a known duration. Human intervention is then limited to positioning the markers on the patient.

Step D(ii) can particularly be implemented by calculating by means of a mathematical model. It is understood that no human intervention is then required when step D(i) also uses a mathematical model, enhancing location reproducibility. By way of example, a model can be used for locating internal references (belonging to the internal structure) from the external envelope.

The first image data received in step A can be generated by sweeping by moving at least one radioactive source in a non-parallel translation direction with an image capture direction.

As a general rule, the second references are preferably selected from references to be located in each of the two radiographic images (also known as stereo-corresponding), and optionally from the references to be located in a single radiographic image (also known as non-stereo-corresponding).

The use during step E of second stereo-corresponding references, that is to say visible in the two radiographic images, makes it possible to enhance the quality of the corrected model. The quality of the corrected model can be further enhanced using two non-stereo-corresponding references. The number of second references suitable for use for correcting the model may be chosen as a function of the nature of the internal structure to be imaged. By way of example, for a vertebra, the use of about ten references can suffice. In general, 10 to 100 control references will be used.

Advantageously, in an embodiment, the first image data received in step A are generated simultaneously, by sweeping, by moving in synchronism, in the same non-parallel translation direction with the image capture directions, two radioactive sources emitting two ionizing ray beams respectively in the two image capture directions. This can help generate radiographic image data in the same three-dimensional frame of reference, for example after a suitable calibration of the radioactive sources.

In an embodiment, the first image data and the second image data are generated simultaneously. The first and second image data can then be generated in the same three-dimensional frame of reference, for example after a suitable calibration of the image recording devices. This makes it possible to avoid realigning the different images in the same three-dimensional frame of reference and to simplify the implementation of the method according to the invention. This frame of reference can then serve as a reference frame of reference for the radiographic imaging method. In this embodiment, step C is not necessary.

In a further embodiment, the first image data and the second image data can be generated in different three-dimensional frames of reference. In other words, each image or each image type is saved in a specific three-dimensional frame of reference. This is for example the case when the images are generated at separate times. In this case, the method comprises a step C of transforming the image data received to the reference frame of reference, which can be implemented in step A, step B or before the use of the data from one of these steps.

This transformation step C can be for example carried out by means of a transformation matrix which makes it possible to switch from one frame of reference to another. This transformation matrix can be determined such that common elements for the first image data and the second image data coincide in the chosen reference frame of reference. These common elements can be part of the image such as, for example, the contour of the images or radio-opaque marking elements of known dimensions positioned on the object to be imaged before the generation of the image data.

In an embodiment, the receiving step (2) of the method according to the invention can comprise:

comparing the internal structure of the first model with pre-listed known internal structures, identifying the closest known internal structure to the internal structure of the first model, selecting an appliance model adapted to the identified known internal structure.

In particular, it can be envisaged to construct a database associating with each listed internal structure an appliance model so as to fully automate the choice of the second model.

Such a database could be enhanced regularly by recording the internal structure of each patient associated with the final model adapted to this patient and obtained by the method according to the invention.

In an embodiment, the transfer step (5) of the method according to the invention can comprise:

(i) projecting the edge curve and the vertex curve of each functional zone of the second model on the external surface of the first model and calculating the coordinates of the edge curve and the vertex curve projected on the external surface in the first model, (ii) correcting the coordinates of each vertex point of the projected vertex curve with which a deformation parameter value as a function of this value is associated, (iii) optionally projecting the contour points or lines of the second model on the external surface of the first model and calculating the coordinates of the projected contour points and lines.

Different methods can be used for the implementation of step (6). In an embodiment, the deformation step (6) can comprise:

(i) identifying the points of the external surface of the first model located inside each edge curve projected on the external surface, (ii) deforming the first model at the level of each functional zone, by moving, along a normal direction to the external surface, the points identified in (i) by a movement distance dependent on the position thereof inside the functional zone.

This movement distance can be defined by predetermined rules which will be applied for each functional zone.

The invention also relates to a computer-readable medium, containing instructions coded to be interpretable by a processor and executed thereby according to the method according to the invention.

The invention further relates to a device for producing a digital representation for producing an appliance adapted to an object forming a part at least of a living body, particularly for the implementation of the method according to the invention, characterized in that it comprises:
    means for receiving a first three-dimensional model of the internal and external structure of the object in a first three-dimensional frame of reference,
    means for receiving a second three-dimensional model of the appliance to be produced defining at least one set of characteristic functional zones of the appliance, and, optionally a contour of the appliance, the second model comprising representative data:
        of coordinates in a second three-dimensional frame of reference of edge points belonging to the edge of a functional zone and of vertex points representing vertices of a functional zone.
        of a value of a deformation parameter, representative of the deformation of the functional zone, associated with each vertex point,
        optionally, of the coordinates in the second frame of reference of contour points or lines of the appliance,
    means for modifying the second model by applying to the points of the model a transformation matrix which expresses the coordinates of these points in the first frame of reference,
    means for calculating, for each functional zone of the second model:
        an edge curve passing through the edge points,
        a vertex curve passing through the vertex points,
    means for transferring to the first model the edge curves, the vertex curves and deformation parameter values associated with each vertex point of the second model, and optionally contour points or lines of the appliance,
    means for deforming the external surface of the first model using the vertex curves to shape the external surface of the first model to the shape of the second model in each functional zone and obtain a corrected first model,
    means for displaying a graphic representation of the corrected first model,
    means for saving the corrected first model in a computer memory as the final model.

In particular, the transformation matrix applied to the second model by the modification means can be as defined with reference to the method.

In an embodiment, the device can comprise:
    means for receiving a correction coefficient input by a user to be applied to each value of the deformation parameter associated with a vertex point,
    means for correcting the values of the deformation parameter of the first model for each of the vertex points, and
    means for saving the corrected values in the computer memory.

In an embodiment, the device can comprise means for transforming the final model into a set of instructions suitable for use for controlling a computer-assisted manufacturing machine, for producing the appliance or a mold of the appliance.

In an embodiment, the device can comprise means for generating the first model by a radiographic imaging method based on image data of the object, particularly from two radiographic images of the internal structure and one three-dimensional image of the external structure of the object.

These generation means can comprise:
    image data reception means for receiving first image data generated in a three-dimensional frame of reference, representative of at least one two-dimensional radiographic image of the internal structure of the object, and second image data generated in a three-dimensional frame of reference representative of a three-dimensional image of an external envelope of the object,
    processing means connected to the reception means arranged to perform at least steps C) to I) of the method,
    transmission means.

In an embodiment, the reception means of the second model can comprise:
    means for comparing the internal structure of the first model with pre-listed known internal structures,
    means for identifying the closest known internal structure to the internal structure of the first model,
    means for selecting an appliance model adapted to the identified known internal structure.

In an embodiment, the transfer means can comprise:
    means for projecting the edge curve and the vertex curve of each functional zone of the second model on the external surface of the first model and means for calculating the coordinates of the edge and vertex curves projected on the external surface in the first model,
    means for correcting the coordinates of each vertex point of the projected vertex curve with which a deformation parameter value as a function of this value is associated,
    optionally, means for projecting the contour points or lines of the second model on the external surface of the first model and means for calculating the coordinates of the projected contour points and lines.

In an embodiment, the deformation means can comprise:
    means for identifying the points of the external surface of the first model located inside each edge curve projected on the external surface,
    means for deforming the first model at the level of each functional zone, configured to move, along a normal direction to the external surface, the points identified by the identification means, by a movement distance dependent on the position of each of these points inside the functional zone.

The invention further relates to a computer program comprising portions of program code for executing steps of the method for producing a digital representation for producing an appliance adapted to an object according to the invention, when said program is executed by a device for producing a digital representation for producing an appliance adapted to an object according to the invention.

Figure 2:
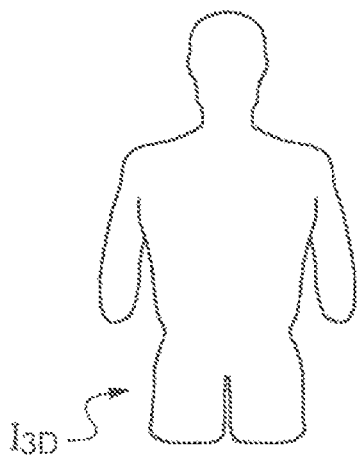
Figure 3:
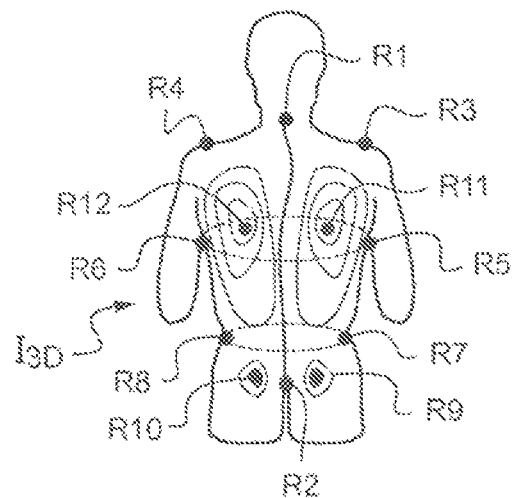
Figure 4:
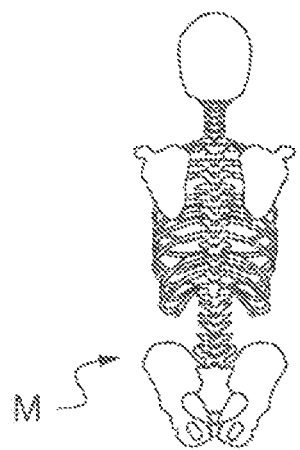
Figure 5:
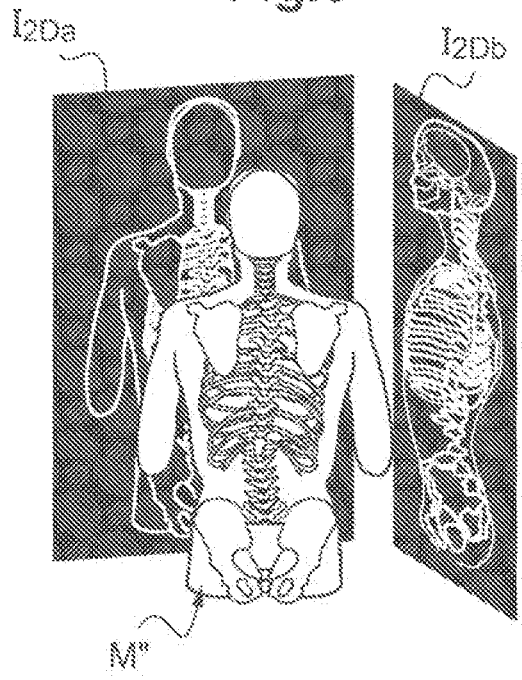
Figure 9:
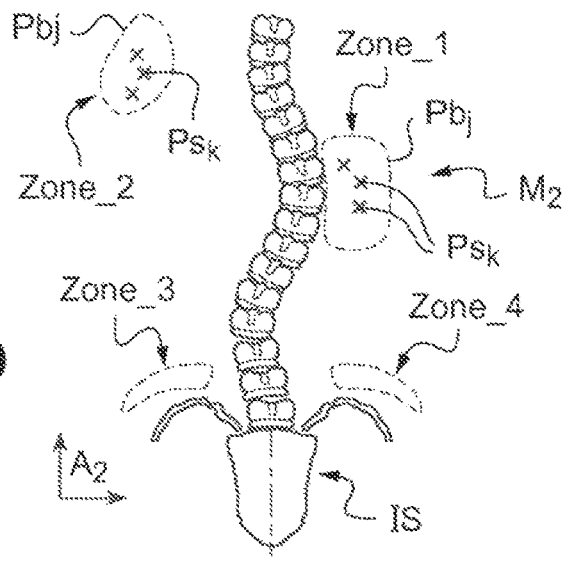
Figure 10:
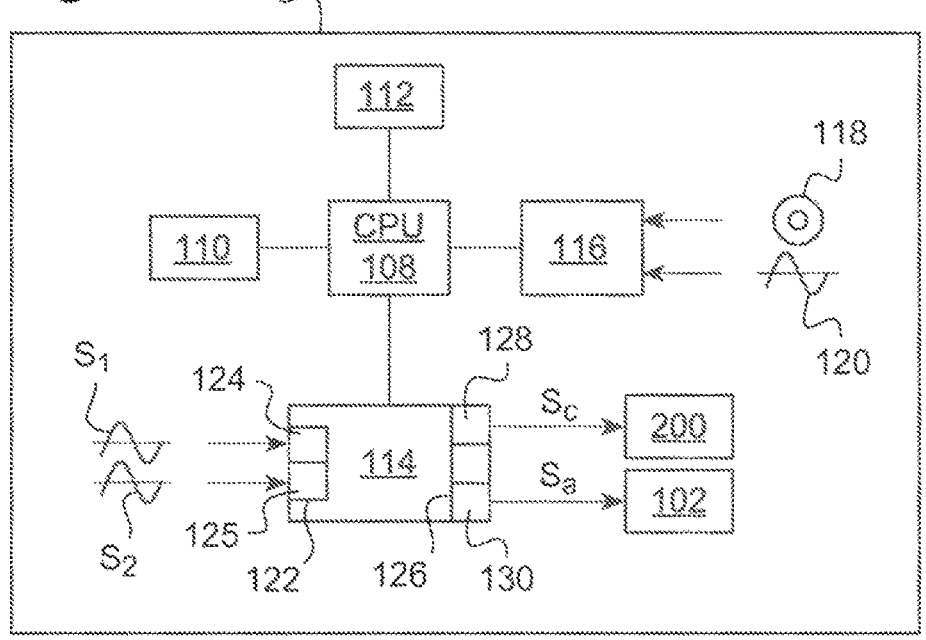
Figure 11A:
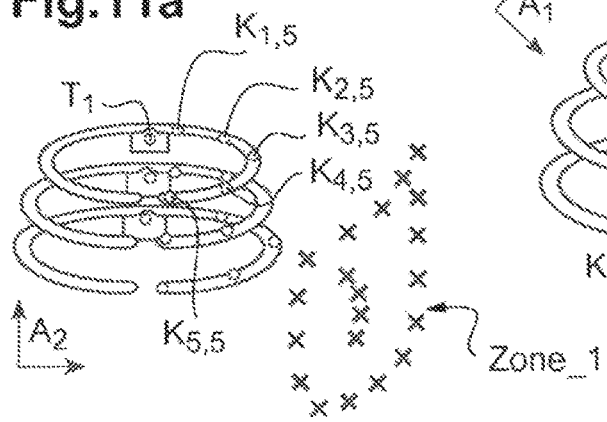
Figure 11B:
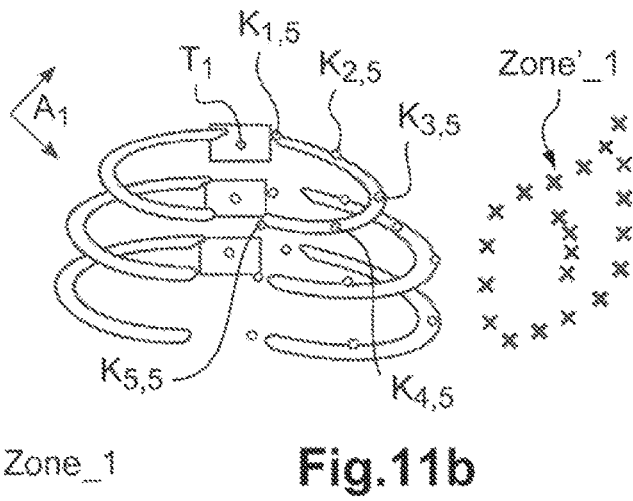
Figure 12:
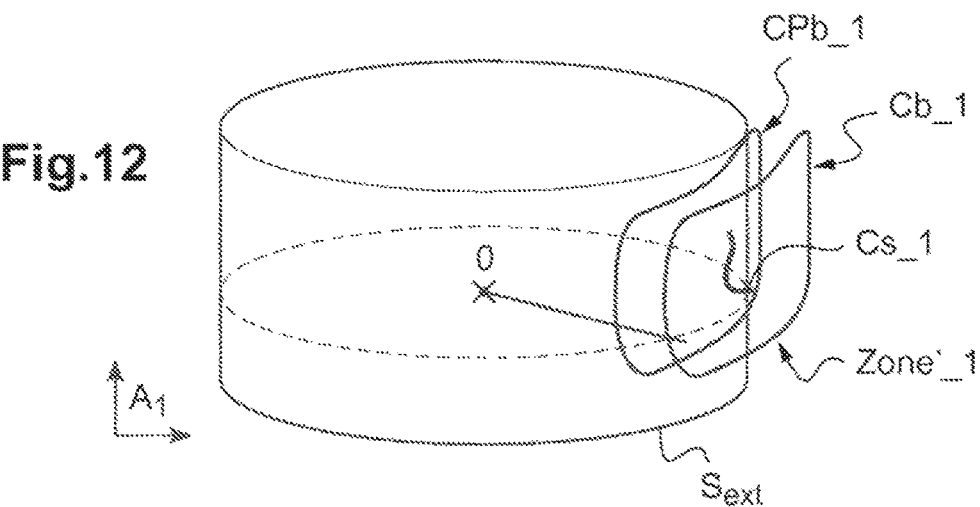
Figure 13:
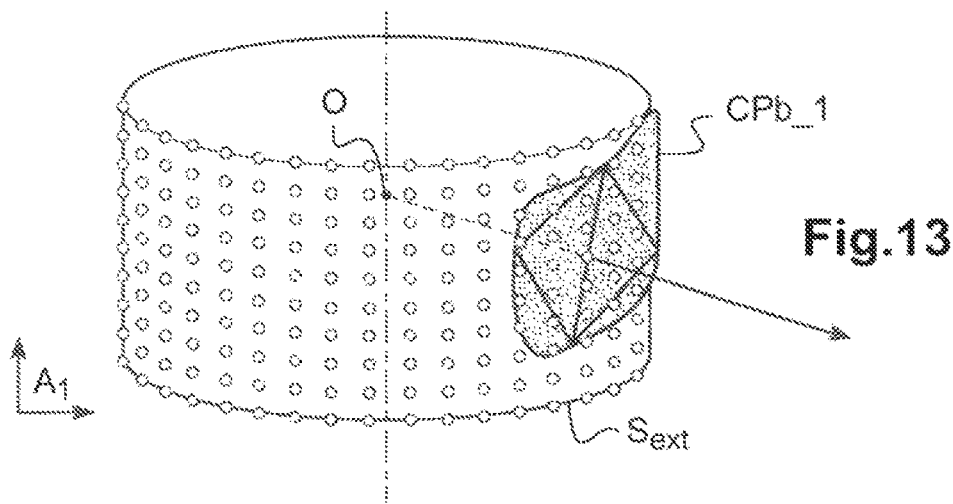
Figure 14:
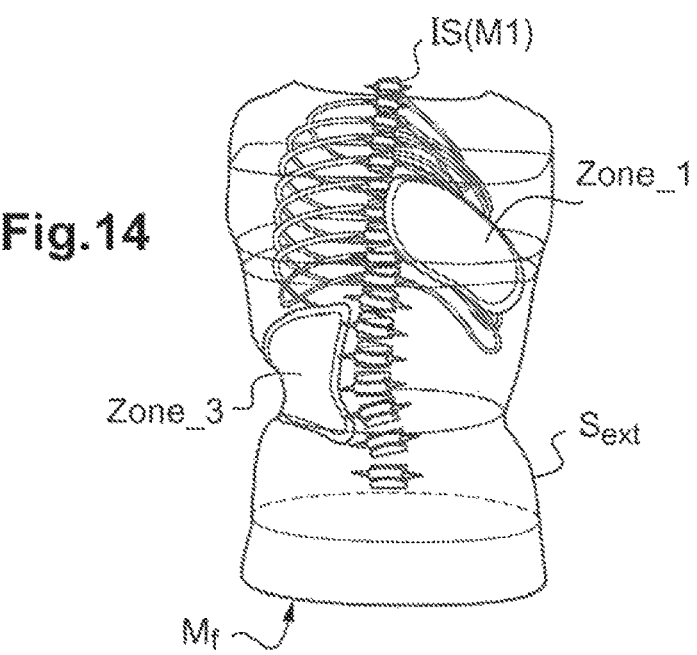

The invention is now described with reference to the appended, non-limiting drawings, wherein:

FIG. 1 is a schematic view of a system for producing an appliance for a living body according to an embodiment;

FIG. 2 is a schematic representation of a digitized 3D image of the external envelope of the patient, FIG. 3 is a similar representation to FIG. 2 wherein external references are represented, FIG. 4 is a schematic representation of a generic 3D model of a skeleton, FIG. 5 is a schematic representation of a calculated 3D model of the patient's skeleton and of the projections thereof on the radiographic images, FIGS. 6a and 6b are schematic cross-sectional representations showing the deformations of the 3D model, FIG. 7 represents the projections of the points on a radiograph and a search zone, FIG. 8 represents a reconstructed 3D model of the patient's skeleton, FIG. 9 schematically represents the functional zones of a second model, FIG. 10 schematically represents the device 100 represented in FIG. 1, FIGS. 11a and 11b schematically represent the internal structure reference points defining the frame of reference of the model M2 (FIG. 11a) and of the model M1 (FIG. 11b), FIG. 12 schematically represents the external surface of the model M1 and the edge and vertex curves of a functional zone, FIG. 13 schematically represents the external surface of the model M1 and the edge and vertex curves of a functional zone projected onto the external surface, FIG. 14 represents a final model obtained with the method according to the invention.

FIG. 1 represents a system for producing an appliance for a living body comprising a device 100 configured to produce a digital representation for producing an appliance adapted to an object forming a part at least of a living body and a computer-aided manufacturing (CAM) machine 200, connected to the device 100.

The device 100 receives a first signal S1 coded with representative data of the internal and external structure of a part of a living body for which an appliance is to be produced. These data form a first model according to the invention and are points of the internal structure and the external structure wherein the coordinates are expressed in a single three-dimensional frame of reference.

In the example, the living body part is a torso T of a patient P, but in other embodiments, the body part can be any part of a living body.

The first signal S1 can be received from a radiographic imaging device 1 represented in FIG. 1, which implements a radiographic imaging method based on image data of the torso T of the patient P. This signal S1 can be received directly or be saved on a medium capable of being read by the device 100.

The device 100 also receives a second signal S2 coded with representative data of the appliance to be produced defining at least a set of characteristic functional zones of the appliance and optionally a contour of the appliance.

The device 100 includes means for executing a computer program adapted to implementing the method described in the present invention and correcting the first model in order to obtain a corrected model, adapted to the patient in question, of the appliance to be produced integrated in the first model.

This corrected model of the appliance to be produced comprises functional zones such as compression zones in the zones of the body that tolerate pressure and/or relief zones in certain zones of the body sensitive to pressure, thus providing a comfortably fitted appliance.

The device 100 also comprises a display device 102 for displaying a representation of the torso T of the patient P, a processing circuit 104 for manipulating the corrected first and/or final model and/or the displayed representation of the torso. In this embodiment, the appliance 100 also comprises a pointing device 106 (mouse) having one or more actuator buttons for receiving a user input and a keyboard 107 belonging to an input interface. The display device 102 can furthermore be a touch-operated device also suitable for receiving a user input.

The manufacturing machine 200 can be a machine comprising a tool for machining a mold from a material such as polyurethane foam or wood. In this case, the mold can represent a larger part of the patient's torso than the part to be fitted with an appliance. For this purpose, a 3-to-5 mill type machine, for example manufactured by the company Orten®, can be used. The machined mold can then be used to form the appliance, such as an orthosis, by molding a thermoplastic or other material on the machined copy. Once it has hardened sufficiently on the mold, the appliance can be removed and, if required, trimmed or processed to obtain the final appliance.

The manufacturing machine 200 can also comprise a 3D printing system to manufacture the appliance directly. For this purpose, a machine such as the HP Jet Fusion 3D 4200 of the brand HP® can for example be used.

The radiographic imaging device 1 represented in FIG. 1 includes a mobile frame 2 vertically movable in a motorized manner on vertical guides 3, in a translation direction 4.

This frame surrounds a field of view 5 wherein a patient P can take position, upright as shown or in a seated position if required.

The mobile frame 2 carries a first radioactive source 6a and a second radioactive source 6b. Each radioactive source 6a, 6b is associated with a detector 7a, 7b, respectively which is disposed facing the source 6a, 6b, beyond the field of view 5. Each detector 7a, 7b includes at least one horizontal row 8a, 8b of detection cells. The sources 6a, 6b and the detectors 7a, 7b are part of a first radiographic imaging system 6.

The radioactive sources 6a, 6b are adapted to emitting ionizing rays, particularly X-rays, in the image capture directions 9a, 9b respectively, these ionizing rays being capable of being detected by the detectors 7a, 7b. The image capture direction 9a is anteroposterior with respect to the patient P whereas the image capture direction 9b is lateral with respect to the patient P.

Conventionally, the ionizing rays emitted by the sources 6a, 6b each traverse a horizontal slit 10a, 10b formed in a reticle 11a, 11 b such as a metallic plate, to generate a horizontal beam 12a, 12b of ionizing rays in the field of view 5.

Obviously, the radioactive sources and the detectors could be greater than 2 in number, and the image capture directions of these different radioactive sources could, if applicable, not be perpendicular with one another, or even horizontal.

The device further comprises at least one optical sensor 13 for carrying out the external digitization of the patient P. Any type of optical image sensor can be used, such as CCD (Couple Charge Device) and CMOS (Complementary Metal Oxide Semiconductor) sensors or indeed sensors capable of measuring an optical depth. Note however that it is preferable to use an optical sensor having a high precision and mesh resolution.

In the example, this optical sensor 13 is mounted on one of the vertical guides 3. The patient is furthermore upright on a platform 14 which can be rotated by means of a motor. A 3D image of the patient can thus be captured by rotating the platform 14 over 360°. This 3D image could be captured by positioning several optical sensors 13 around the patient P instead of rotating same. 5 or 6 optical sensors distributed around the patient could for example be used to digitize the external envelope of the patient P, particularly simultaneously with radiograph capture. In a further alternative embodiment, the 3D image could be captured by moving a single optical sensor 13 around the patient, either manually, or automatically by means of a motorized arm, a rail, or other.

The optical sensor(s) 13 are part of a second imaging system 15.

The two detectors 7a, 7b and the optical sensor 13 are connected to a radiographic image processing device 20, for example a computer, particularly a microcomputer, or other electronic control system such as, for example one or more processors of the microprocessor, microcontroller or other type.

The computer 20 includes means for executing a computer program adapted to implementing the radiographic imaging method described in the present invention. This computer thus comprises portions of program code for executing each of the steps of the radiographic imaging method. Each portion of code can be written in any suitable programming language, such as C, and/or C++, for example. The computer 20 comprises image data reception means 21 for receiving image data representative of one or more radiographic images and of one three-dimensional image of an external envelope of the object. It also comprises processing means 22 connected to the reception means 21 arranged to execute steps C to I described above of the radiographic imaging method. Finally, it comprises transmission means 23, particularly to a display device 24, herein a screen, connected to the processing means 22. The reception means 21 are for example an input port, an input pin, or other. The processing means 22 can for example comprise a processor core or CPU (Central Processing Unit) configured to execute program codes for the implementation of each of the steps of the radiographic imaging method. The transmission means 23 can for example comprise an output port, an output pin, or other. The reception 21, processing 22 and transmission 23 means form means for generating a model of an object by a radiographic imaging method.

The computer 20 can also include memorization means 25 connected to the processing means 22, which can be a RAM (Random Access Memory), EEPROM (Electrically-Erasable Programmable Read-Only Memory), or other memory. These memorization means can particularly memorize the different data models, and optionally the computer program.

The computer 20 is furthermore herein equipped with: an input interface comprising at least a keyboard 26 and generally a mouse (not shown), and an output interface comprising at least the screen 24 and generally a printer (not shown).

The computer 20 can also be connected to the motorized drive means (not shown) contained in the guides 3 and in the rotary platform 14, to the sources 6a, 6b and to the optical sensor 13, so as to control on one hand the vertical movement of the frame 2 and the emission of the ionizing rays, and, on the other, the rotation of the rotary platform 14 and the operation of the optical sensor 13.

The detectors 7a, 7b can for example be gaseous detectors sensitive to low radiation doses, for example of the type described in the documents FR-A-2 749 402 or FR-A-2 754 068. Obviously, other types of detectors could optionally be used within the scope of the present invention. Detection can be carried out by a purely linear detector (one image line at a time), or by a matrix detector of any aspect ratio.

Model of the Internal and External Structure

The operation of the radiographic imaging device is now detailed with reference to FIGS. 2 to 8.

By means of the computer 20, two digital radiographic images I2Da, I2Db of the patient P are acquired, for example by sweeping the field of view 5 with the ionizing ray beams 12a, 12b over a height corresponding to the height of the zone of the patient to be observed, for example the spine and the pelvis, or the entire skeleton. For this purpose, the frame 2 is preferably movable over a sufficient height, for example of 70 cm or more, or even of 1 meter or more. Following a suitable calibration of the sources 6a, 6b and the detectors 7a, 7b, the radiographic imaging system 6 generates first image data of the two radiographs in the same three-dimensional frame of reference. These first image data are transmitted to the computer 20 (step A).

Before or after the capture of the digital radiographic images, again by means of the computer 20, a three-dimensional image I3D (FIG. 2) is captured of the external envelope of the patient P by rotating, particularly over 360°, the platform 14 supporting the patient P. The second imaging system 15 then generates second image data in a second three-dimensional frame of reference different from the preceding one, the image captures not being capable of being simultaneous. These second image data are transmitted to the computer 20 (step B). It is then necessary to transform the first or the second image data to express same in the same reference frame of reference, which can be one of the frames of reference wherein the first or second image data are generated or another frame of reference (step C). This transformation can be carried out (by the processing means 22) by means of a transformation matrix as described above.

For a simultaneous capture of this digital 3D image with the radiographs, instead of using a rotary platform, several optical sensors 13 disposed around the patient P could be used. Suitable calibration of the sources 6a, 6b and the optical sensor 13 would then allow generating the first and second image data in the same three-dimensional frame of reference. The transformation step C is then not necessary.

The digital images I2Da, I2Db, I3D of the examined part of the patient are transmitted to the processing means 22 (steps A, B). They can optionally be saved in the memory of the computer 20 and viewed on the computer screen 24. In the example, the digital radiographic images I2Da, I2Db are anteroposterior and lateral images (FIG. 5).

A geometric position is then estimated (step D) in the reference frame of reference in 3D of one or more points of interest (first references) belonging to the internal structure. These first references are characteristic of the internal structure.

This estimation preferably involves the estimation of the geometric position of external references, in other words references belonging to the external envelope. The location of external references on the external envelope of the object has the advantage of enabling a radiation-free estimation of the internal structure of this object.

The estimation of the geometric position of the external references is preferably automatic, for example using known methods, such as those described by Michonski et al. (Automatic recognition of surface landmarks of anatomical structures of back and posture. J Biomed Opt. 2012 May; 17(5):056015).

Gaussian curves can also be used to identify external references which can subsequently be used to estimate the position of the first internal references.

As represented in FIG. 3, the following external references can preferentially be identified:

R1: vertebra prominens of C7, R2: top of the gluteal crease, R3 and R4: left and right shoulders (points immediately above the subaxillary folds), R5 and R6: left and right subaxillary folds, R7, R8: left and right points of the waist, R9, R10: left and right posterosuperior iliac spines, R11, R12 bottom corners of the left and right scapula.

The anatomical parameters such as the dimensions of the vertebrae and bone structures can be estimated using regression equations linked to external anthropometric measurements, as described by Bertrand et al., Estimation of external and internal human body dimensions from few external measurements, Journal of Musculoskeletal Research, Vol. 12, No. 4 (2009) 191-204). Such an estimation of the characteristic lengths of anatomical references of the internal structure makes it possible to calculate the possible position of this internal reference (herein referred to as first reference).

Several studies have also proposed external-internal relationships to estimate the centers of the vertebral bodies from the external surface (The prediction of lumbar spine geometry: method development and validation. Campbell-Kyureghyan N, Jorgensen M, Burr D, Marras W. Clin Biomech (Bristol, Avon). 2005 June; 20(5):455-64).

Various non-rigid transformation laws can also be envisaged to estimate the position of the references of the internal structure (Seo et al. An automatic modeling of human bodies from sizing parameters. In: SI3D '03: Proceedings of the 2003 symposium on Interactive 3D graphics, New York, N.Y., USA, ACM Press (2003) 19-26).

The method is presented herein with reference to the spinal column, but a similar method could also be used for a simple internal structure of which one would have an a priory knowledge, such as a simple bone, such as a single vertebra, a ligamental structure, or other, or a set of anatomical structures such as a lower or upper limb, or others. Other anatomic references adapted to the structures to be viewed/imaged will then be used. Furthermore, according to the internal structure to be viewed/imaged, the digitization of the external envelope can be carried out on the patient's whole body or on a limited part of the body (only the rear of the torso for example).

Once the coordinates (in the reference frame of reference) of the first references are estimated and the values of the anatomical parameters have optionally been estimated (step D), it is possible to calculate (step E) the three-dimensional shape of a model representing the internal structure based on a generic model thereof.

For this purpose, generic models of the internal structures represented in the radiographic images, in particular the vertebrae, but optionally also other internal anatomical structures, such as ligaments or others, are provided. These models can be saved in the computer 20.

A generic model, for example established using a database, can be defined as a mesh of a few hundred to a few hundred thousand points of a structure.

Such generic models are for example established using databases containing data relative to specific references of the structure. These data can comprise positions of characteristic points of the structure, characteristic lengths of the structure, or indeed characteristic segments, lines or arcs of the structure, and/or contours and edges of the structure. For a vertebra, the base contains for example the position of some twenty characteristic points of the vertebra, characteristic lengths of the vertebra.

The database can also contain data relating to the relative location of the internal structure in the skeleton of the subject from whom it is obtained. In the case of a vertebra, this involves for example the angular orientation of the vertebra and the spinal curvature at the level of the vertebra.

It is possible to establish rankings of the objects in different categories in order to distinguish characteristic data of healthy or diseased subjects, and/or characteristics of the weight, height, age or any other type of parameter of an individual.

A generic model can include for example statistical data (means, variances, etc.) for each parameter of the database, or indeed mathematical equations suitable for determining for a given object the location of characteristic points based on the value of estimating parameters of this object.

In an embodiment, the three-dimensional shape of a model representing the internal structure is calculated using a generic model thereof for example by configuring the latter by means of the first references and optionally the anatomical parameters which have been estimated, preferably automatically, from the digital image I3D of the external envelope.

FIG. 4 schematically represents the generic model M of the subject's bone structure, FIG. 5 showing the calculated model M" obtained by parameterization of the model M. The subject's scoliosis observed is thus visible on the calculated model M".

This parameterization of the generic model M can be carried out by modifying the dimensions of the generic model in accordance with the anatomical parameters.

It is possible for example to use the method described by Hwang et al. ("Rapid Development of Diverse Human Body Models for Crash Simulations through Mesh Morphing," SAE Technical Paper 2016-01-1491, 2016).

For this, the coordinates of one or more points of the generic model M corresponding to first references are matched with the coordinates of these first references estimated from the data of the image I3D. This positioning can be carried out with respect to the positions of the vertebrae associated with each pair of ribs. Then, the generic model is deformed geometrically retaining the lengths to match the stress given by the external envelope. A mechanical model can also be used at this stage (Closkey, R. F., Schultz, A. B. and Luchies, C. W. (1992) A model for studies of deformable rib cage. Journal of Biomechanics, 25, 529-539).

For example, when the structure to be imaged is the ribcage, the generic model M is first set to the patient's dimensions by means of first references and anatomical parameters to obtain a model M', then, it is positioned inside the digitized image I3D of the external envelope with respect to the positions of the vertebrae associated with each pair of ribs, as shown in FIG. 6a. The model M' is then in the same reference frame of reference as the image I3D of the external envelope. In this FIG. 6a, the letter "V" denotes a vertebra, to which the ribs C1 and C2 are connected. The solid line corresponds to the image of the external envelope I3D, whereas the dotted line corresponds to the model M'. The ribs C1, C2 of the model M' are then deformed geometrically while retaining the lengths thereof to correspond to the stress given by the external shape of the torso, in particular thoracic gibbosity, as shown in FIG. 6b. A calculated 3D model M" of the internal structure to be viewed/imaged is thus obtained (step E). During this step, rigging (skeleton deformation by direct or inverse kinematics) and skinning (association of each bone of the skeleton with a portion of the skin) animation techniques can be used (Avatar reshaping and automatic rigging using a deformable model. Feng A., Casas D., Shapiro A. Proceeding MIG '15 Proceedings of the 8th ACM SIGGRAPH Conference on Motion in Games p 57-64).

Then (step F (i)) the calculated 3D model M" is projected onto each of the radiographed images I2Da, I2Db (FIG. 5). This projection helps identify anatomical references (second references) in the 2D radiographs without requiring image processing, which makes it possible to accelerate this identification and render same more reliable. The choice of the second references can be automatic or manual with operator designation. These second references can be the same as the first references or not.

The projection used is for example a linear projection. This projection can be performed using the DLT (acronym of "Direct Linear Transformation") technique. It is also possible to modify the equations of the DLT technique by carrying out a simplification. By projecting the model M", estimated 2D coordinates of the second references in each radiographed image I2Da, I2Db are thus obtained (step F(ii)) This initial estimation is then refined (step F(iii)), by defining a search zone located around the projection of the second reference of the calculated model in the radiographed image. FIG. 7 represents the projections of a plurality of these points Pi on a radiograph, where i is a whole number representing a number of points. For clarity reasons, only a few points P1, P2, P3 are represented. The zone Z1 corresponds to the search zone of the projection reference P1.

This step commences for example with a segmentation of the ROI (Regions Of Interest).

Filters can then be applied for identifying the zones of high negative and positive densities (oriented filter). A Canny filter applied to these ROI then makes it possible to determine contours which can be used with the generalized Hough technique (using a vertebra model).

Alternatively, instead of using oriented and Canny filters, the initial estimations can be enhanced automatically with an active contour method such as gradient vector flow (GVF) (Moura et al. Fast 3D reconstruction of the spine from biplanar radiographs using a deformable articulated model. Med Eng Phys. 2011 October; 33(8):924-33).

Step F(iii) makes it possible to obtain the coordinates of the second references on each of the radiographic images for the stereo-corresponding references or on one of the radiographic images for the non-stereo-corresponding references. From these more accurate coordinates, it is possible to recalculate the coordinates of the second references in the reference frame of reference (step G) and correct the model calculated in step E by coinciding the points of the calculated model corresponding to the second references with the most accurate coordinates thereof calculated in step G (step H). In other words, this optimizes the 2D projections of the 3D model M".

When the 2D projections of the 3D model M" have been optimized by processing the radiographic data, the 3D model M" can be reconstructed (step I). For this purpose, the model M" is corrected for example by Direct Linear Transformation (DLT) using the same pairs of points (with the updated coordinates thereof) as during the projection (second references). A reconstructed model M1 is then obtained (FIG. 8).

This reconstruction is carried out using the second references which are stereo-corresponding. The epipolar geometry, using non-stereo-corresponding references, can also be used to obtain a more accurate reconstruction of the model M1 (NSCP (Non-Stereo-Corresponding Point) type method). For example, after the reconstruction of the stereo-corresponding points (step G), the model M1 is initialized.

The non-stereo-corresponding points of the model M1 will be projected only into one of the two radiographic views (I2Da or ID2b) wherein it is known that the search will be possible. The model M1 us updated by integrating the non-stereo-corresponding points.

The model M1 obtained is a three-dimensional model of the internal and external structure of the torso of the patient P in a first three-dimensional frame of reference which corresponds to the reference frame of reference mentioned in the radiographic imaging method described above.

This model M1 thus comprises representative data:
of coordinates of points of the internal structure,
of coordinates of points of the external structure (namely surface points).

These coordinates are expressed in a single three-dimensional frame of reference.

External structure denotes herein the shape of the envelope of the object, namely the shape of the external surface thereof.

These data of the model M1 are coded in the first signal S1 received by the device 100 during the step (1) of the method according to the invention.

Model of the Appliance to be Produced

This second model M2 is a three-dimensional model of the appliance to be produced defining at least one set of characteristic functional zones of the appliance and optionally a contour of the appliance.

According to the nature of the appliance (orthosis or prosthesis), these functional zones can be pressure zones (or compression or depression zones), discharge zones (or relief zones), cutting zones (for example for a corset), openings, notches, zones for receiving components such as fastening straps or riveting zones.

The model M2 comprises representative data:
of coordinates in a second three-dimensional frame of reference of edge points belonging to the edge of a functional zone and of vertex points representing vertices of a functional zone.
of a value of a deformation parameter, representing the deformation of the functional zone, associated with each vertex point.

When it is sought to use the method according to the invention to generate the appliance directly, it is then necessary for the second model to comprise data relating to the contour of the appliance, such as the coordinates in the second frame of reference of contour points or lines.

When the method according to the invention is used to produce a mold whereon the appliance will be thermoformed, the presence of appliance contour data in the second model is not required.

As a general rule, an appliance model M2 is designed for a specific structure and a specific external envelope, as explained hereinafter.

FIG. 9 schematically represents 4 functional zones Zone_i (i integer different to zero from 1 to 4) of a model M2 each comprising edge points $Pb_j$, vertex points $Ps_k$. With each vertex point $Ps_k$ a deformation parameter value $V_k$ is associated (j and k: positive integers different to zero representing the number of points). The internal structure IS represented is not part of the model M2 and is represented merely in order to show the positioning of the functional zones with respect to the internal structure.

The deformation parameter corresponds for example to a distance and the value thereof can be expressed in mm.

This parameter corresponds to the distance separating a vertex point from the surface of the model patient for whom the appliance model M2 has been produced. This distance is measured along a normal direction to the surface of the external shape of the model patient.

The data of the model M2 are coded in the second signal received by the device 100.

Device Processing Circuit

As represented in FIG. 10, the device 100 is a computer, for example a microcomputer or other electronic control system such as, for example one or more processors of the microprocessor, microcontroller or other type. In the example, the processing circuit 104 of the device 100 comprises a CPU processor core 108, a computer memory 110, a hard drive or an external or downloadable drive 112, an input/output interface 114, and a multimedia drive 116, connected to one another.

The computer memory 110 can comprise one or more memories selected from a RAM (Random Access Memory), ROM (Read-Only Memory), EEPROM (Electrically-Erasable Programmable Read-Only Memory), or other memory. The computer memory 110 can be used to store the different models and data and the computer program.

In particular, the CPU 108 can be configured to carry out each of the steps of the method according to the invention and the embodiments described above. By executing the program to implement the method for producing a digital representation according to the invention, the CPU 108 functions as a device comprising modification means, calculating means, transfer means, deformation means, recording means.

The computer program thus comprises portions of program code for executing each of the steps of the method for producing a digital representation for producing an appliance adapted to an object according to the invention. These portions of code can be stored in the computer memory 110 or downloaded, preferably stored in the computer memory.

Each portion of code is configured to control the CPU 108 so as to supply a specific function described in a step of the method. In other words, hereinafter in the description, each step described must be understood as corresponding to a specific portion of code configured to control the CPU 108 so that it executes the method step. Each portion of code can be written in any suitable programming language, such as C, and/or C++, for example.

The media drive 116 facilitates the loading of program codes in the computer memory using a computer-readable medium, such as a CD-ROM disc 118, or a computer-readable signal 120, as received on a network such as the Internet, for example. Note that the computer 20 previously described can also be provided with such a media drive.

The input/output interface 114 comprises:
a first input interface 122 having:
   an input 124 for receiving the signal S1 coded with the representative data of the model M1 of the internal and external structure of the torso T,
   an input 125 for receiving the signal S2 coded with the representative data of the model M2 of the appliance to be produced, and
a second output interface 126 having
   an output 128 for producing a control signal Sc coded with the instructions for controlling the machine 200,
   an output 130 for producing a display signal Sa for triggering the display on the display device 102 of the corrected internal and external structure of the torso T wearing the appliance.

It will be noted that each signal S1, S2 can arrive via the multimedia drive or via the input interface 122, or via the same single input.

The interfaces 122 and 126 can be a universal serial bus (USB) or an RS232 serial bus for example.

In an embodiment not shown, the CPU 108 can include the processing means 22 of the radiographic imaging device 1 and the input/output interface can comprise the reception 21 and transmission means 23 of the device 1. In other words, a single computer can be used to implement all the steps of the method according to the invention. The device 100 and the computer 20 then form the same single computer.

Operation

During the first step (1), the CPU 108 receives the first model M1 defined in a first frame of reference A1, for example generated by the means for generating a first model of the radiographic image device 1, in the form of a first coded signal S1.

During the second step (2), the CPU 108 receives the second model M2 in the form of a second coded signal S2. The second model M2 is defined in a second frame of reference A2 different from the first frame of reference.

By executing program codes to implement these steps (1) and (2), the CPU 108 functions as reception means.

It will be noted that step (2) follows step (1): the opposite could however be envisaged, in particular when the type of model M2 is selected manually by a user.

Then, during step (3), the CPU 108 modifies the model M2 by applying to the points of the model a transformation matrix which expresses the coordinates of these points in the first frame of reference (reference frame of reference of the model M1).

The second frame of reference can be defined by characteristic references of the internal structure of the object to be fitted with an appliance. These references can be selected from internal functional references and anatomical references.

An internal functional reference is a reference which is variable from one patient to another and which can be defined with respect to a pathology (it can then consist of an anatomical reference, such as for example the top vertebra) or which can be defined with respect to a movement (instantaneous center or rotation of a joint, knee for example, which is not connected directly to an anatomical reference). An internal anatomical reference is an invariable fixed reference from one patient to another defined geometrically by the anatomical location thereof (example spinous process of C7).

FIG. 11a represents the characteristic references $T_1$, $K_{1,5}$, $K_{2,5}$, $K_{3,5}$, $K_{3,\,5}$, $K_{4,5}$, $K_{5,5}$ of the internal structure IS(M2) which make it possible to define the second frame of reference of a model M2 of a scoliosis corset, and one of the functional zones Zone_1 of the model M2. The references shown correspond respectively to anatomical references $T_1$, $K_{1,5}$, $K_{2,5}$, $K_{3,5}$, $K_{3,\,5}$, $K_{4,5}$, $K_{5,5}$. If $T_1$ is the Vertex vertebra, then these references are also referred to as TS, KS, 5, KS+1, 5, KS+2 5, KS+3, 5 KS+4, 5 and are functional references.

These different references $T_1$, $K_{1,5}$, $K_{2,5}$, $K_{3,5}$, $K_{3,\,5}$, $K_{4,5}$, $K_{5,5}$ exist in the first model M1, with different relative positions from those observed in the second model M2.

A transformation matrix can thus be calculated so as to match these different references, for example with the least squares method. Preferably, the transformation applied is non-rigid, to enable a linear deformation of the second model along the three axes of the frame of reference (affine transformation).

FIG. 11b represents the same reference points in the first model M1 and the functional zone Zone'_1 obtained following the application of the matrix.

This step (3) of modifying the second model thus makes it possible to modify (deform) the second model M2 so as to adapt same in part to the specific shape of the object to be fitted with an appliance, in other words to the first model M1.

By executing program codes to implement step (3), the CPU 108 functions as deformation means.

During the next step (4), the CPU 108 calculates for each functional zone Zone_i of the second model M2, an edge curve Cb_i passing through the edge points $Pb_j$ and a vertex curve Cs_i passing through the vertex points $Ps_k$. These curves are represented in FIG. 12.

These curves, sometimes referred to as "splines", are curves calculated by means of functions defined in pieces by a polynomial on each interval between edge points or vertex points. Preferably, these curves are continuous for superior model precision and superior appliance comfort. Third degree polynomials are then used.

This calculation of the edge and vertex curves is preferably carried out after the modification step (3), on the zones Zone'_i, in order to limit the quantity of data to be processed during step (3). The curves are then calculated (parameterized) in the first frame of reference.

It could however be envisaged to calculate these curves in the second frame of reference, before step (3), and apply the transformation matrix to these curves.

Step (4) of calculating the edge and vertex curves of each functional zone thus makes it possible to enhance the second model M2, in other words increase the number of points for which the coordinates are contained in the second model, which helps enhance the precision of the model.

By executing program codes to implement step (4), the CPU 108 functions as calculating means.

The second model M2 originates from a specific model, designed for a specific internal structure and a specific external envelope. Step (3) helps adapt the shape of the second model to the internal structure, but does not take into account the external structure: thus the points of the second model are not necessarily on the external envelope of the object in question.

During the next step (5), for each zone Zone'_i, the CPU 108 transfers to the first model M1 the edge curves Cb_i, the vertex curves Cs_i and the deformation parameter values $V_k$ associated with each vertex point of the second model, and optionally the contour points or lines of the appliance. By executing program codes to implement step (5), the CPU 108 functions as transfer means.

Transfer denotes the movement of the edge and vertex curves over the external surface of the first model, optionally the movement of the contour points or lines of the appliance over the external surface of the appliance, but also the transfer of the deformation parameter values associated with each vertex point of the second model.

This transfer thus relates to the edge curves, the vertex curves and the deformation parameter values associated with each vertex point of the second model, and optionally the contour points or lines of the appliance.

The transfer of step (5) thus makes it possible to position the edge curves and the vertex curves accounting for the deformation parameter values for the latter, and optionally the contour points or lines of the second model of the appliance, on the external envelope of the first model. However, the shape of the external envelope of the first model still needs to be adapted to the vertex curves transferred: this is the purpose of the deformation step (6).

The CPU 108 then deforms during step (6) the external surface of the first model using the vertex curves to shape the external surface of the first model to the shape of the second model in each functional zone and obtain a corrected first model M1*corr*. By executing program codes to implement step (6), the CPU 108 functions as deformation means of the external surface of the model M1.

The method can comprise a step (7) during which the CPU 108 displays a graphic representation of the corrected first model M1*corr* for example on the display device 102. By executing program codes to implement step (7), the CPU 108 functions as display means.

Finally, the CPU 108 then records in step (8) the corrected first model M1*corr* in the computer memory (110) as a final model Mf. By executing program codes to implement step (7), the CPU 108 functions as recording means.

Embodiment examples of certain steps are now detailed.

During the second step (2) of receiving the second model, the CPU 108 receives a second model comprising data expressed in the second three-dimensional frame of reference A2, different from the first frame of reference A1.

The second model M2 received can be selected by a user from known models, according to clinical data and/or according to the internal structure of the patient.

These known models can be digitized models of appliances actually used for specific patients. In other words, the model M2 can be the digital model of an existing appliance produced for a patient presenting a specific pathology: such a model is then defined according to the internal structure and the external envelope specific to the patient.

The model M2 can also be a generic appliance model intended for a specific pathology. In this case, it is also defined according to a specific internal structure and external envelope.

For some types of appliances, it is possible to envisage a semi-automatic or automatic selection of the second model from a set of existing appliance models, particularly when it is possible to produce databases associated with each pathology, a generic digitized model of a type of appliance used for the pathology in question or a digitized model of the appliance used for a specific patient suffering from this pathology.

The selection of the model received in step (2) can thus be automated, for example using a database listing the pathologies, characteristic data of these pathologies, particularly image data, and existing appliances. These image data are for example representative data of radiographs obtained for a specific scoliosis. They can be associated with an appliance model to be used for the pathology in question.

For example, in the case of a scoliosis, a database can contain different types of scoliosis and associate with each type of scoliosis radiographic image data of the characteristic internal structure of the scoliosis (for example one or more radiographs of the spinal column) and an appliance model to be used, as represented in table 1.

TABLE 1

| example of database | | | |
|---|---|---|---|
| Type of scoliosis | A | B | C |
| Radiographic image data | Data $X_A$ | Data $X_B$ | Data $X_C$ |
| Appliance model | $M2_A$ | $M2_B$ | $M2_C$ |

The CPU 108 can then compare the data of the internal structure of the first model M1 with the data $X_A$, $X_B$, $X_C$ of the internal structures of the database, then, identify the known internal structure data closest to the data of the internal structure of the first model M1, for example $X_B$, and finally select the appliance model $M2_B$ adapted to the known internal structure identified.

By executing program codes to implement these steps, the CPU 108 functions as internal structure comparison means, internal structure identification means and appliance model selection means.

An embodiment example of transfer step (5) is now detailed. This step (5) makes it possible to take into account, at least in part, the external surface of the object by transferring the second model to the first model.

This transfer can comprise a projection of the edge curves and the vertex curves, and optionally the contour points or lines, on the external surface of the first model, for example using a so-called "ray tracing" technique. This technique consists of splitting the destination object, herein the first model, into horizontal sections (the object in question being in a usual position, namely an upright position for a patient), and projecting each point of the start object (herein the second model) to the destination object (herein the external surface of the first model) along a direction passing via the center of the horizontal section wherein the point of the start object is contained.

FIG. 12 represents very schematically the external structure Sext of the model M1 as well as a functional zone Zone'_1 belonging to the model M2 (transformed by the matrix during step (3)) and defined by the edge curve (Cb_1) thereof, the vertex curve (Cs_1) thereof and the deformation parameter values.

The CPU 108 executes the transfer as follows. The edge curve Cb_1 of the functional zone Zone'_1 of the model M2 is projected (point by point) onto the external surface Sext of the model M1 using the ray tracing technique, in a horizontal plane, the center of the section obtained being designated by the letter O. A projected edge curve CPb_1 is thus obtained and the coordinates thereof on the external surface in the model M1 are calculated (step (5)(i). In other words, the edge curve obtained CPb_1 belongs to the external structure of the model M1.

The CPU 108 then proceeds in the same manner for the vertex curve Cs_1 and calculates the coordinates of this vertex curve projected onto the external surface. In order to restore the vertex curve to the shape thereof before projection, the CPU 108 corrects the coordinates of the projected vertex curve by applying the deformation parameter values thereto. For this, each point of the vertex curve with which a deformation parameter value is associated is moved along a normal direction to the external surface of the deformation parameter value, and the coordinates thereof are thus corrected (step (5)(ii)).

Finally, when the machine 200 is a 3D printer, the model M2 must contain contour points or lines required for producing the appliance. In this case, the CPU 208 also transfers these contour points or lines (step (5)(iii)) according to the same method as the edge curves, for example by projection onto the external surface, particularly using the ray tracing technique.

By executing program codes to implement these steps 5(i)(ii)(iii), the CPU 108 functions as means for projecting and calculating an edge curve, or contour points or lines, and means for correcting the coordinates of the vertex points.

These steps 5(i)(ii)(iii) make it possible to position the edge curves and optionally the contour points or lines of the appliance, on the external envelope of the first model. However, the shape of the external envelope of the first model still needs to be adapted to the vertex curves transferred: this is the purpose of the deformation step (6), an embodiment thereof is detailed hereinafter.

During step (6), the CPU 108 starts by identifying the points of the external surface of the model M1 located inside each edge curve CPb_i projected onto the external surface (step (6) (i)).

As for any modelled surface, the external surface of the model M1 is defined by points distributed according to a mesh, the mesh size thereof can be variable according to the manner wherein the surface is modelled, as represented in FIG. 13. The present embodiment has the advantage of being independent of the type of mesh used. By executing program codes to implement step 6(i), the CPU 108 functions as means for identifying points of the external surface.

Step (6)(i) of identifying points can thus use a polygon triangulation algorithm, which consists of decomposing the polygon formed by an edge curve into a (finite) set of triangles, associated with a ray tracing technique.

For this purpose, the polygon can be triangulated using the method described by Bernard Chazelle ("Triangulating a simple polygon in linear time", Discrete Comput. Geom., vol. 6, 1991, p. 485-524).

Each functional zone, defined by an edge curve which forms a polygon, can thus be decomposed into a set of triangles as represented in FIG. 13. The ray tracing technique can then be used to identify the points of the external surface belonging to the functional zone defined by the curve CPb_1 by proceeding as follows: each point of the external surface is linked with the center O of the corresponding horizontal cross-section. If the line obtained intersects with one of the triangles of a functional zone, then the point of the external surface is a point of the functional zone and is identified as such (FIG. 13).

The identification of the points belonging to the external surface of each functional zone being carried out, the CPU 108 can then perform the deformation per se of the model M1 at the level of each functional zone (step (6)(ii)). This deformation consists of moving each identified point along a normal direction to the external surface, by a movement distance according to the position of the point in question inside the functional zone.

By way of example, the following rules can be applied:
any identified point located at a distance from the closest vertex point greater than or equal to a threshold distance $d_{threshold}$ must not be moved (movement distance $d_{dis}(0)=0$),
any identified point located at a zero distance from the closest vertex point must be moved by a maximum distance such that, after movement, the identified point is merged with the vertex point, (movement distance $d_{dis}(\max)=x$, x being the distance separating the vertex point from the external surface of the first model),
any identified point located at a distance $d_{point}$ from the closest vertex point less than the threshold distance is moved by a movement distance $d_{dis}(\text{point})$ proportional to the maximum movement distance:

$$d_{dis}(\text{point}) = \frac{d_{point}}{d_{threshold}} \times d_{dis}(\max)$$

The threshold distance $d_{threshold}$ can for example be from 9 to 11 cm for a corset type appliance.

The distance between a point of the external surface and a vertex point is for example defined as the value of the norm of a vector connecting these two points.

The closest vertex point can thus be found by comparing the distances between a mesh point and the different vertex points and by retaining the vertex point for which the distance is the shortest.

By executing program codes to implement step 6(ii), the CPU 108 functions as deformation means of the external surface of the first model at the level of each functional zone.

At the end of step (6), the CPU 108 supplies the corrected first model, M1*corr*. The CPU 108 can then receive a correction coefficient input by a user to be applied to each deformation parameter value associated with a vertex point. By executing program codes to implement this step, the CPU 108 functions as means for receiving a correction coefficient.

This input can result from an input of a correction coefficient value directly by means of the keyboard or an input via the pointing device 106, or indeed directly via the display device 102 if it is touch-operated, which can for example be used to move a vertex point of the graphic representation along a normal to the external surface of a given coefficient.

According to the data input, the CPU 108 corrects all the deformation parameter values of the first model M1*corr*. This correction can be simultaneous with the movement of the pointing device 106. In other words, in this embodiment, the vertex points cannot be moved independently of one another. By executing program codes to implement this step, the CPU 108 functions as deformation parameter value correction means.

When this operation performed by a user is complete, the model M1*corr* with the new deformation parameter values is saved by the CPU 108 in the computer memory 110 as the final model Mf, represented in FIG. 14.

When no user input is required, the corrected model M1*corr* represents the saved final model.

This final model contains:
The representative data of the internal structure IS(M1) specific to the patient received with the data from step (1),
the representative data of the external structure Sext of the patient received with the data from step (1) but modified at the level of the functional zones of the appliance,
the representative data of the appliance to be produced, including the deformation parameter values.

The CPU 108 can then transform the data of the final model into a set of instructions suitable for use for controlling the computer-assisted manufacturing machine 200, for producing the appliance or a mold of the appliance.

This set of instructions can be coded into a control signal Sc capable of being transmitted to the machine 200 either directly, or via a computer-readable medium.

The invention claimed is:

1. A method for producing a digital representation for producing an appliance adapted to an object forming a part at least of a living body, comprising:
   (1) receiving a first three-dimensional model of an internal and external structure of the object in a first three-dimensional frame of reference,
   (2) receiving a second three-dimensional model of the appliance to be produced defining at least one set of characteristic functional zones of the appliance, the second three-dimensional model comprising representative data:
   of coordinates in a second three-dimensional frame of reference of edge points belonging to an edge of a functional zone and of vertex points representing vertices of the functional zone,
   of a value of a deformation parameter, representative of deformation of the functional zone, associated with each vertex point,
   (3) modifying the second three-dimensional model by applying to the edge and/or vertex points of the second three-dimensional model a transformation matrix which expresses coordinates of the edge and/or vertex points in the first three-dimensional frame of reference,
   (4) calculating for each functional zone of the second three-dimensional model:
   an edge curve passing through the edge points,
   a vertex curve passing through the vertex points,
   (5) transferring to the first three-dimensional model the edge curves, the vertex curves and the deformation parameter values associated with each vertex point of the second three-dimensional model,
   (6) deforming an external surface of the first three-dimensional model according to the vertex curves to shape the external surface of the first three-dimensional model to a shape of the second three-dimensional model in each functional zone and obtain a corrected first three-dimensional model,
   (7) saving the corrected first three-dimensional model in a computer memory as a final model.

2. The method according to claim 1, further comprising:
receiving a correction coefficient input by a user to be applied to each value of the deformation parameter associated with a vertex point,
correcting the values of the deformation parameter of the first three-dimensional model for each of the vertex points, thereby obtaining corrected values, and
saving the corrected values in the computer memory.

3. The method according to claim 1, further comprising:
transforming the final model into a set of instructions for controlling a computer-assisted manufacturing machine, for producing the appliance or a mold of the appliance.

4. The method according to claim 1, wherein the step (1) of receiving a first three-dimensional model of the internal and external structure of the object comprises generation of the first three-dimensional model by a radiographic imaging method from image data of the object from two radiographic images of the internal structure of the object and one three-dimensional image of the external structure of the object.

5. The method according to claim 4, wherein the generation of the first three-dimensional model by the radiographic imaging method, comprises:
   A. receiving first image data generated in a first three-dimensional reference frame of reference, representative of two two-dimensional images of the internal structure of the object captured along two non-parallel image capture directions,
   B. receiving second image data generated in a second reference frame of reference, representative of a three-dimensional image of an external envelope of the object,
   C. when the first three-dimensional reference frame of reference and second reference frame of reference are different, transforming the first and second image data received into a single frame of reference,
   D. estimating from the second image data coordinates in the single reference frame of reference of first characteristic references of the internal structure of the object,
   E. calculating, in the single reference frame of reference, a three-dimensional shape of a model representing said internal structure from a previously known generic model of said internal structure of the object, the previously known generic model including points corresponding to the first characteristic references, the calculated three-dimensional shape of model being obtained by deformation of the previously known generic model such that said calculated three dimensional shape of model follows closest possible shape to an isometry of the previously known generic model while keeping points of the deformed previously known generic model coinciding with the first characteristic references, F. choosing at least one second characteristic reference of the internal structure of the object to be located on each of the two radiographic images or on a single radiographic image, and for each second characteristic reference:
(i) identifying a point belonging to the three dimensional shape of model calculated in step E) corresponding to the second characteristic reference,
(ii) calculating coordinates of a projection of the identified point in step (i) onto the radiographic image(s),
iii) determining from the first image data coordinates of the second characteristic reference on the radiographic image by searching in a search zone located around the projection coordinates calculated in step (ii), G. calculating coordinates of the second characteristic references in the single reference frame of reference from the projection coordinates calculated in step (ii) on at least one of the radiographic images determined in step F, H. correcting the three dimensional shape of model calculated in step E by matching points of the calculated three dimensional shape of model corresponding to the second characteristic references with the coordinates calculated in step G, I. reconstructing a model of the internal and external structure of the object with data of the three dimensional shape of model corrected in step H) and second image data of the three-dimensional image of the external envelope of the object expressed in the single reference frame of reference.

6. The method according to claim 5, wherein said step of estimating from the second image data comprises estimating a value of at least one characteristic parameter of the internal structure of the object; and
wherein the calculated three dimensional shape of model is obtained by applying characteristic parameter(s) of the internal structure of the object.

7. The method according to claim 1 wherein step (2) of receiving the second three dimensional model comprises:
comparing the internal structure of the object of the first three dimensional model with pre-listed known internal structures,
identifying a prelisted known internal structure that is closest to the internal structure of the object of the first three dimensional model,
selecting an appliance model adapted to the identified closest prelisted known internal structure.

8. The method according to claim 1, wherein at least one step selected from the transfer step (5) and the deformation step (6) is defined as follows:
the transfer step (5) comprises:
(i) projecting the edge curve and the vertex curve of each functional zone of the second three dimensional model on an external surface of the first three dimensional model and calculating coordinates of the edge curve and the vertex curve projected on the external surface in the first three dimensional model,
(ii) correcting coordinates of each vertex point of the projected vertex curve with which is associated a deformation parameter value as a function of the deformation parameter value,
the deformation step (6) comprises:
(i) identifying points of the external surface of the first three dimensional model located inside each edge curve projected on the external surface of the first three dimensional model,
(ii) deforming the first three dimensional model at a level of each functional zone, by moving, along a normal direction to the external surface of the first three dimensional model, the points identified in (i) by a movement distance dependent on a position of each of the points identified in (i) inside the functional zone.

9. The method according to claim 8, wherein the transfer step (5) comprises projecting contour points or lines of the second three dimensional model on the external surface of the first three dimensional model and calculating coordinates of the projected contour points or lines of the second three dimensional model.

10. A non-transitory computer-readable medium, having executable programming instructions stored thereon interpretable by a processor circuit and when executed performs the method according to claim 1.

11. A computer program stored on a non-transitory computer-readable medium, comprising programming instructions for executing steps of the method for producing a digital representation for producing an appliance adapted to an object according to claim 1, when said program is executed by a device for producing a digital representation for producing an appliance.

12. The method according to claim 1, further comprising after step (6):
receiving a correction coefficient input by a user to be applied to each value of the deformation parameter associated with a vertex point,
correcting the values of the deformation parameter of the first three dimensional model for each of the vertex points and thereby obtaining the corrected values, and
saving the corrected values in the computer memory.

13. The method according to claim 1, wherein said step of receiving the second three-dimensional model of the appliance comprises receiving a contour of the appliance;
wherein the second three dimensional model comprises representative data of coordinates in the second three dimensional frame of reference of contour points or lines of the appliance;
wherein said step of transferring to the first three dimensional model comprises transferring to the first three dimensional model the contour points or lines of the appliance; and
wherein said method further comprises displaying a graphic representation of the corrected first three dimensional model.

14. A device for producing a digital representation for producing an appliance adapted to an object forming a part at least of a living body, comprising:
means for receiving a first three-dimensional model of an internal and external structure of the object in a first three-dimensional frame of reference,
means for receiving a second three-dimensional model of the appliance to be produced defining at least one set of characteristic functional zones of the appliance, the second three dimensional model comprising representative data:
of coordinates in a second three-dimensional frame of reference of edge points belonging to an edge of a functional zone and of vertex points representing vertices of a functional zone,
of a value of a deformation parameter, representative of deformation of the functional zone, associated with each vertex point,
means for modifying the second three dimensional model by applying to the vertex and/or edge points of the model a transformation matrix which expresses coordinates of the vertex and/or edge points in the first three dimensional frame of reference,
means for calculating, for each functional zone of the second three dimensional model:
an edge curve passing through the edge points,
a vertex curve passing through the vertex points,
means for transferring to the first three dimensional model the edge curves, the vertex curves and deformation parameter values associated with each vertex point of the second three dimensional model,
means for deforming an external surface of the first three dimensional model using the vertex curves to shape the external surface of the first three dimensional model to a shape of the second three dimensional model in each functional zone and obtain a corrected first three dimensional model,
means for displaying a graphic representation of the corrected first three dimensional model,
means for saving the corrected first three dimensional model in a computer memory as a final model.

15. Device according to claim 14, further comprising:
means for receiving a correction coefficient input by a user to be applied to each value of the deformation parameter associated with a vertex point,
means for correcting the values of the deformation parameter of the first three dimensional model for each of the vertex points, thereby obtaining corrected values, and
means for saving the corrected values in the computer memory.

16. The device according to claim 14, further comprising one or more of the following features:
means for transforming the final model into a set of instructions for controlling a computer-assisted manufacturing machine, for producing the appliance or a mold of the appliance,
means for generating the first three dimensional model by a radiographic imaging method from image data of the object from two radiographic images of the internal structure of the object and one three-dimensional image of the external structure of the object,
the means for generating the first three dimensional model comprise:
image data reception means for receiving first image data generated in a three-dimensional frame of reference, representative of at least one two-dimensional radiographic image of the internal structure of the object, and second image data generated in a three-dimensional frame of reference representative of a three-dimensional image of an external envelope of the object,
processing means connected to the reception means arranged to perform the following steps:
A. receiving first image data generated in a first three-dimensional reference frame of reference, representative of two two-dimensional images of the internal structure of the object captured along two non-parallel image capture directions,
B. receiving second image data generated in a second reference frame of reference, representative of a three-dimensional image of an external envelope of the object,
C. when the first three dimensional reference frame of reference and second reference frame of reference are different, transforming the first and second image data received into a single frame of reference,
D. estimating from the second image data coordinates in the single reference frame of reference of first characteristic references of the internal structure of the object, and the value of at least one characteristic parameter of the internal structure,
E. calculating, in the single reference frame of reference, the three-dimensional shape of a model representing said internal structure of the object from a previously known generic model of said internal structure of the object, the previously known generic model including points corresponding to the first characteristic references, the calculated three dimensional shape of model being obtained by deformation of the previously known generic model such that said calculated three dimensional shape of model follows closest possible shape to an isometry of the previously known generic model while keeping points of the deformed previously known generic model coinciding with the first characteristic references, and by applying to the calculated three dimensional shape of model characteristic parameter(s) of the internal structure of the object,
F. choosing at least one second characteristic reference of the internal structure of the object to be located on each of the two radiographic images, and at least a second reference to be located on a single radiographic image, and for each second characteristic reference:
(i) identifying a point belonging to the three dimensional shape of model calculated in step E) corresponding to the second characteristic reference,
(ii) calculating coordinates of a projection of the identified point in step (i) onto the radiographic image(s),
iii) determining from the first image data coordinates of the second characteristic reference on the radiographic image by searching in a search zone located around the projection coordinates calculated in step (ii),
G. calculating coordinates of the second characteristic references in the single reference frame of reference from the projection coordinates calculated in step (ii) on at least one of the radiographic images determined in step F,
H. correcting the three dimensional shape of model calculated in step E by matching points of the calculated three dimensional shape of model corresponding to the second characteristic references with the coordinates calculated in step G,
I. reconstructing a model of the internal and external structure of the object with data of the three dimensional shape of model corrected in step H) and the second image data of the three-dimensional image in the single reference frame of reference of the external envelope of the object expressed in the reference frame of reference; and
transmission means.

17. The device according to claim 14, wherein the means for receiving the second three dimensional model comprise:

means for comparing the internal structure of the object of first three dimensional model with pre-listed known internal structures, means for identifying a prelisted known internal structure that is closest to the internal structure of the object of the first three dimensional model, means for selecting an appliance model adapted to the identified closest prelisted known internal structure.

18. The device according to claim 14, wherein the transfer means comprise:

means for projecting the edge curve and the vertex curve of each functional zone of the second three dimensional model on a model on the external surface of the first three dimensional model and means for calculating coordinates of the edge and vertex curve projected on the external surface in the first three dimensional model, means for correcting coordinates of each vertex point of the projected vertex curve with which is associated a deformation parameter value as a function of the deformation parameter value, means for projecting contour points or lines of the second three dimensional model on the external surface of the first three dimensional model and means for calculating coordinates of the projected contour points or lines of the second three dimensional model.

19. The device according to claim 14, wherein the means for deforming an external surface of the first three dimensional model comprise:

means for identifying points of the external surface of the first three dimensional model located inside each edge curve projected on the external surface of the first three dimensional model, means for deforming the first three dimensional model at level of each functional zone, moving, along a normal direction to the external surface of the first three dimensional model, the points identified by the identification means, by a movement distance dependent on a position of each of the points identified by the identification means inside the functional zone.

20. The device of claim 14, wherein the means for receiving a second three-dimensional model of the appliance to be produced defining at least one set of characteristic functional zones of the appliance and a contour of the appliance;

wherein the second three dimensional model comprises representative data of coordinates in the second three dimensional frame of reference of contour points or lines of the appliance; and wherein said means for transferring to the first three dimensional model further comprises transferring contour points or lines of the appliance.

* * * * *